(12) United States Patent  
Wu et al.

(10) Patent No.: US 11,437,689 B2  
(45) Date of Patent: Sep. 6, 2022

(54) BATTERY COVER PLATE ASSEMBLY, BATTERY CELL, BATTERY MODULE, POWER BATTERY AND ELECTRIC AUTOMOBILE

(71) Applicant: BYD COMPANY LIMITED, Guangdong (CN)

(72) Inventors: Wengang Wu, Shenzhen (CN); Yanchu Liu, Shenzhen (CN); Xubin Gong, Shenzhen (CN); Jun Tang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 144 days.

(21) Appl. No.: 17/050,295

(22) PCT Filed: Apr. 11, 2019

(86) PCT No.: PCT/CN2019/082302  
§ 371 (c)(1),  
(2) Date: Oct. 23, 2020

(87) PCT Pub. No.: WO2019/205951  
PCT Pub. Date: Oct. 31, 2019

(65) Prior Publication Data  
US 2021/0234242 A1 Jul. 29, 2021

(30) Foreign Application Priority Data  
Apr. 23, 2018 (CN) .......................... 201810368473.5

(51) Int. Cl.  
*H01M 50/528* (2021.01)  
*H01M 50/249* (2021.01)  
(Continued)

(52) U.S. Cl.  
CPC ......... *H01M 50/528* (2021.01); *H01M 50/15* (2021.01); *H01M 50/209* (2021.01);  
(Continued)

(58) Field of Classification Search  
CPC .. H01M 50/528; H01M 50/249; H01M 50/30; H01M 50/209; H01M 50/15; H01M 2220/20  
See application file for complete search history.

(56) References Cited

U.S. PATENT DOCUMENTS

2017/0047565 A1    2/2017   Byun et al.

FOREIGN PATENT DOCUMENTS

| CN | 204946952 U | 1/2016 |
| CN | 205790089 U | 12/2016 |
| CN | 206322739 U | 7/2017 |

OTHER PUBLICATIONS

International Search Report and Written Opinion for Application No. PCT/CN2019/082302, dated Jul. 12, 2019, 9 pages.

*Primary Examiner* — Jane J Rhee

(57) ABSTRACT

A battery cover plate assembly, a cell, a battery module, a power battery and an electric vehicle are provided. The battery cover plate assembly includes a cover plate, a first pole, a second pole, a flipping member, a scored member, a first conductive member and a telescopic assembly. The second pole includes an upper pole and a lower pole spaced apart from each other. The flipping member is configured to turn over under the action of gas pressure inside the battery and push, by means of the telescopic assembly, the first conductive member to move to break a score, so as to electrically disconnect the upper pole from the lower pole.

19 Claims, 4 Drawing Sheets

(51) Int. Cl.
  *H01M 50/30*     (2021.01)
  *H01M 50/209*    (2021.01)
  *H01M 50/15*     (2021.01)
(52) U.S. Cl.
  CPC ......... *H01M 50/249* (2021.01); *H01M 50/30* (2021.01); *H01M 2220/20* (2013.01)

BATTERY COVER PLATE ASSEMBLY, BATTERY CELL, BATTERY MODULE, POWER BATTERY AND ELECTRIC AUTOMOBILE

CROSS-REFERENCE TO RELATED APPLICATIONS

This application is a national phase application of International Patent Application No. PCT/CN2019/082302, filed with the China National Intellectual Property Administration (CNIPA) on Apr. 11, 2019, and entitled "BATTERY COVER PLATE ASSEMBLY, BATTERY CELL, BATTERY MODULE, POSER BATTERY AND ELECTRIC AUTOMOBILE", which is based on and claims priority to and benefits of Chinese Patent Application Serial No. 201810368473.5, filed with the CNIPA on Apr. 23, 2018. The entire content of all of the above-identified applications is incorporated herein by reference.

FIELD

The present disclosure relates to the battery field, and specifically, to a battery cover plate assembly, a cell including the battery cover plate assembly, a battery module including the cell, a power battery including the battery module, and an electric vehicle including the power battery.

BACKGROUND

As an energy storage unit, batteries play an important role in all walks of life. For example, power batteries are widely used in fields such as new energy vehicles. A battery pack can include a battery module formed by a plurality of cells connected in series or parallel to realize charging and discharging. During the charging and discharging process of the power battery, a battery management system (BMS) is usually used to monitor the voltage and current changes and calculate the state of charge. If there is a problem with voltage sampling, it may cause the battery to be overcharged. Especially for a ternary system, if the overcharge reaches a certain level, the battery will burn and explode.

The existing technical solution includes monitoring the voltage and current of the battery, calculating the battery level by using a current integration method and an open circuit voltage method, and controlling the charging and discharging of the battery according to the battery level. However, this solution has shortcomings. For example, if voltage sampling or current sampling of the battery fails or software fails, the charging of the battery will be out of control and may last for an unduly long time. Especially in the case of charging from a charging pile, if the communication between the charging pile and the battery manager fails, the overcharge cannot be controlled, and once overcharged to a certain level, the battery will swell or even explode or burn.

In view of the above-mentioned problems, a circuit-breaking solution and a short-circuiting protection solution are adopted in the prior art.

In the circuit-breaking solution, gas pressure inside the battery is used to push the a flipping member to turn over and break a scored member connected thereto, so as to disconnect the cell core from the pole to protect the cell core. However, this solution has drawbacks, because once the cell core is disconnected, the entire circuit will be disconnected, the battery pack and the module will stop working, and pure electric vehicles may instantly lose power output, which poses a safety risk. In the short-circuiting solution, gas pressure inside the battery is used to pushing a flipping member to turn over to short-circuit the positive and negative electrodes, so that a fuse disposed inside the cell core blows, thereby breaking the circuit to protect the cell core. However, in this solution, when the fuse disposed inside the cell core is blown, a lot of heat is produced, which may lead to vaporization of the electrolytic solution or other abnormalities, resulting in more serious abnormal changes inside the cell core.

SUMMARY

An objective of the present disclosure is to provide a battery cover plate assembly. When the battery is abnormal, the battery cover plate assembly can electrically disconnect the cell core from the external circuit to prevent the battery from thermal runaway which causes swelling or even explosion or burning.

To achieve the above objective, the present disclosure provides a battery cover plate assembly, including a cover plate, a first pole, a second pole, a flipping member, a scored member and a first conductive member. The first pole is electrically connected to the cover plate. The second pole includes an upper pole and a lower pole spaced apart from each other. The upper pole and the lower pole are both fixed in an electrically insulated manner to the cover plate. The second pole is electrically connected to a cell core. The first conductive member is electrically connected to the upper pole. The scored member is divided by a score thereon into a first scored member and a second scored member. The first scored member is electrically connected to the first conductive member. The second scored member is electrically connected to the lower pole. The cover plate includes a cover plate body. The flipping member is disposed on the cover plate body and is in communication with gas inside a battery. The battery cover plate assembly further includes a telescopic assembly. The telescopic assembly includes an insulation column and a sleeve slidably sleeved thereon. One end of the insulation column is connected to one of the flipping member and the first conductive member. One end of the sleeve is connected to the other one of the flipping member and the first conductive member. The flipping member is configured to turn over under the action of gas pressure inside the battery and push, by means of the telescopic assembly, the first conductive member to move to break the score, so as to electrically disconnect the upper pole from the lower pole.

In some embodiments, one end of the insulation column is connected to the flipping member, and one end of the sleeve is connected to the first conductive member.

In some embodiments, the insulation column is in the shape of a stepped shaft and includes a large-diameter portion and a small-diameter portion, a step surface is formed between the large-diameter portion and the small-diameter portion, the small-diameter portion is slidably fitted in the sleeve, the large-diameter portion is connected to the flipping member or the first conductive member, and when the step surface is in contact with an end face of the sleeve, the first conductive member starts to move.

In some embodiments, the flipping member is provided with a groove structure, and a lower end portion of the insulation column is fitted in the groove structure.

In some embodiments, the cover plate further includes a second conductive member, the upper pole is fixed in an electrically insulated manner to the second conductive member, the second conductive member is electrically connected to the cover plate body, the lower pole is fixed in an electrically insulated manner to the cover plate body, and the first conductive member is configured to move under driving of the flipping member, so as to come into contact with the second conductive member to form an electrical connection.

In some embodiments, the second conductive member is formed as a protection cover covering the lower pole, the flipping member, the scored member, the first conductive member and the telescopic assembly.

In some embodiments, the second conductive member includes a top plate and a sidewall plate extending downward from an edge of the top plate, the upper pole is embedded in an electrically insulated manner on the top plate, and a lower end of the sidewall plate is electrically connected to the cover plate body.

In some embodiments, the first conductive member is configured to move under driving of the flipping member, so as to come into contact with the top plate.

In some embodiments, the first conductive member is formed thereon with a first protrusion configured for contact with the second conductive member.

In some embodiments, a top surface of the first protrusion is formed as an inclined surface, so that the first protrusion forms a surface contact with the second conductive member.

In some embodiments, the top surface is tilted at an angle in the range of 5°-20°.

In some embodiments, the first protrusion and the insulation column are coaxially disposed.

In some embodiments, the first conductive member includes a main body portion and a mounting portion, the mounting portion is electrically connected to the upper pole, the main body portion is formed as an elongated structure, one end of the main body portion is connected to the sleeve or the insulation column, the other end of the main body portion is flexibly connected to the mounting portion, and a middle portion of the main body portion is electrically connected to the first scored member.

In some embodiments, the first conductive member is an integral electrically conductive sheet, the first conductive member further includes an intermediate portion formed between the main body portion and the mounting portion, and a thickness of the intermediate portion is less than thicknesses of the main body portion and the mounting portion.

In some embodiments, the main body portion is parallel to the mounting portion, the intermediate portion is perpendicular to the main body portion and the mounting portion, the main body portion and the mounting portion are located on the same side of the intermediate portion, and a length of the main body portion is greater than a length of the mounting portion.

In some embodiments, the cover plate body is provided with a through hole in communication with the gas inside the battery, and the flipping member covers the through hole.

In some embodiments, the first scored member is provided with a second protrusion, and the second protrusion is electrically connected to the first conductive member.

In some embodiments, the score is disposed surrounding the second protrusion.

In some embodiments, the score is formed into an elliptical shape.

In some embodiments, the scored member is supported by an upper end of the lower pole, and the upper pole and the lower pole are not coaxial.

In some embodiments, an annular recess supporting the scored member is formed at the upper end of the lower pole, and an outer periphery of the scored member is fitted and fixed on an inner periphery of the annular recess.

By means of the above technical solution, when the battery is overcharged or under other abnormal conditions, the temperature of the battery rises and the gas pressure therein increases, the flipping member can turn over under the action of the gas pressure inside the battery to break the score, so as to electrically disconnect the cell core from the external circuit to prevent the battery from thermal runaway which causes explosion or burning.

In addition, because the sleeve and the insulation column are nested with each other, they can move relative to each other, so that when the gas pressure inside the battery is low, the flipping member drives the insulation column and the sleeve to move toward each other. During this movement, both the first conductive member and the scored member are in an unstressed natural state. Only when the gas pressure inside the battery rises to a certain value and the telescopic assembly is pressed to the maximum extent, the first conductive member starts to become stressed. As the gas pressure continues to rise, the first conductive member deforms to break the score on the scored member. That is to say, in the present disclosure, the configuration of the telescopic assembly allows the flipping member to have a certain distance of idle stroke. When the gas pressure inside the battery is low, the moving distance of the flipping member is limited within the idle stroke, during which process the scored member is not stressed. Only after the gas pressure rises to a preset value, the scored member starts to become stressed. Therefore, the present disclosure can avoid the case that the scored member is in a stressed state for a long term and consequently the actual breaking force of the scored member is lower than the designed value or even the scored member prematurely fails, thereby prolonging the service life of the scored member, and ensuring the safety of the battery.

According to another aspect of the present disclosure, a cell is provided, including a cell casing and a cell core accommodated in the cell casing, and further including the battery cover plate assembly described above. The cover plate is configured to package the cell casing. The lower pole and the cell core are electrically connected to each other by an inner lead-out member.

According to another aspect of the present disclosure, a battery module is provided. The battery module includes a plurality of cells described above and a plurality of connectors. One end of the connector is electrically connected to the first pole of one of the cells, and the other end of the connector is electrically connected to the upper pole of the second pole of another cell.

According to another aspect of the present disclosure, a power battery is provided, including a battery pack housing and a battery module disposed inside the battery pack housing. The battery module is the battery module described above.

According to another aspect of the present disclosure, an electric vehicle is provided. The electric vehicle includes the power battery described above.

Other features and advantages of the present disclosure will be described in detail in the following detailed implementation.

LIST OF REFERENCE NUMERALS

1: cover plate; 11: cover plate body; 111: through hole; 12: second conductive member; 121: top plate; 122: sidewall plate; 2: first pole; 3: upper pole; 4: lower pole; 41: annular recess; 5: flipping member; 51: flange; 52: groove structure; 6: scored member; 61: first scored member; 611: second protrusion; 62: score; 63: second scored member; 7: first conductive member; 71: first protrusion; 711: top surface; 72: main body portion; 73: mounting portion; 74: intermediate portion; 8: insulation column; 81: large-diameter portion; 82: step surface; 83: small-diameter portion; 9: first insulating ring; 10: second insulating ring; 100: cell; 101: cell casing; 102: cell core;

103: battery cover plate assembly; 103a: second pole; 103b: telescopic assembly; 104: inner lead-out member; 200: sleeve; 300: battery module; 301: connector; 400: power battery; 401: battery pack housing; 500: electric vehicle; L1: distance between the connection point between the main body portion and the first scored member and the connection point between the main body portion and the mounting portion; L2: distance between the connection point between the main body portion and the sleeve or the insulation column and the connection point between the main body portion and the mounting portion.

DETAILED DESCRIPTION

The specific implementations of the present disclosure will be described in detail below with reference to accompanying drawings. It should be understood that the following specific implementation are only used for illustrating the present disclosure and not intended to limit the present disclosure.

Unless otherwise specified, nouns of locations such as "up, down, left, and right" used in the present disclosure are generally defined based on figure plane directions of corresponding accompanying drawings, and "inside and outside" refers to an inner part and an outer part of a corresponding component.

Figure 1:
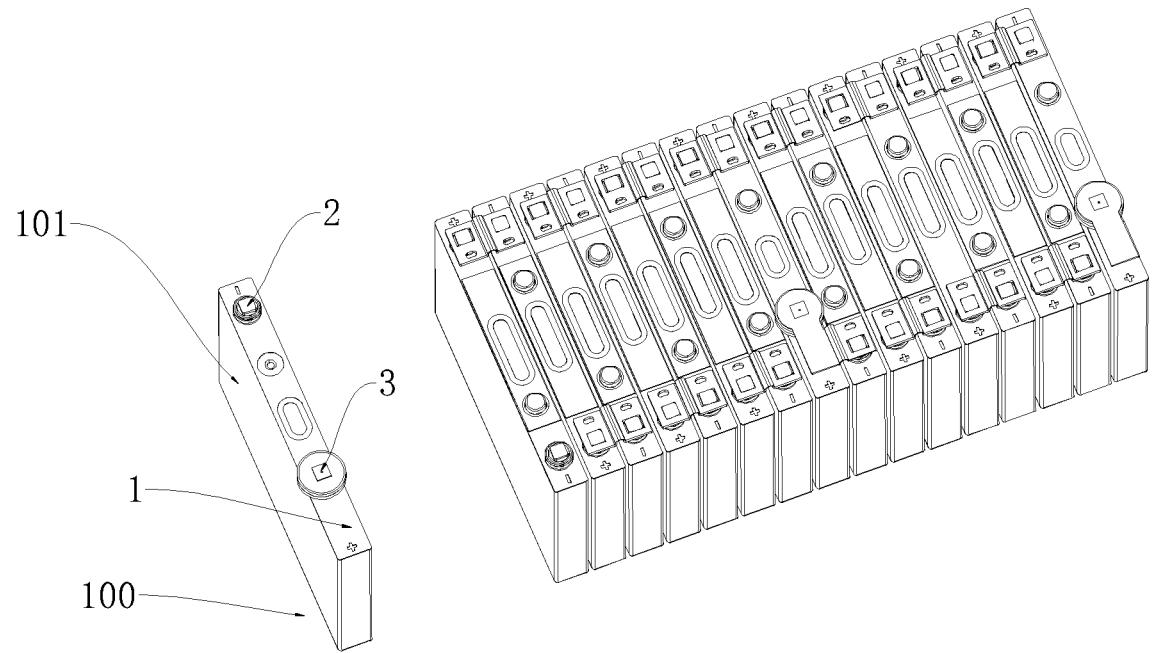
FIG. 1 is a partial three-dimensional exploded view of a power battery according to an implementation of the present disclosure.
Figure 5:
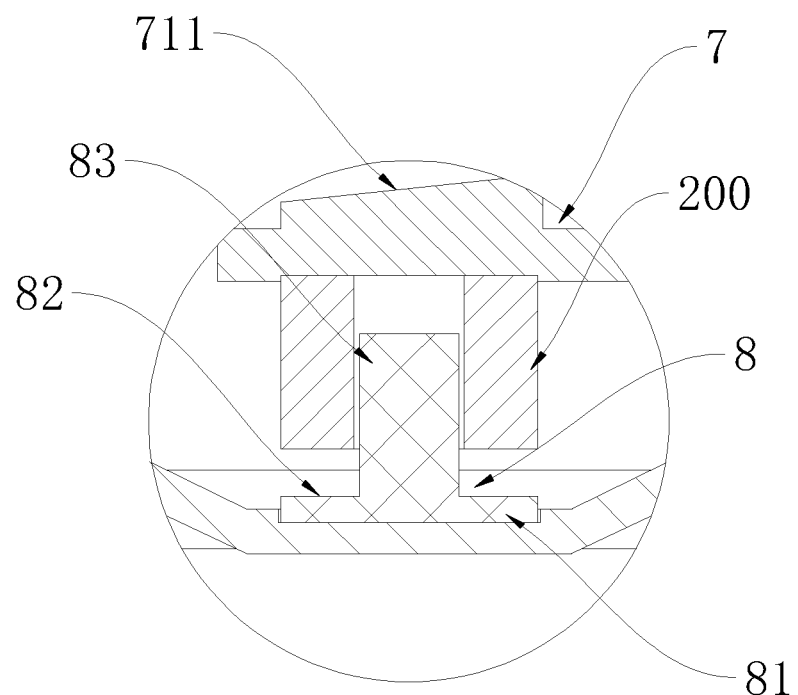
FIG. 5 is a schematic enlarged view of part B in FIG. 3.
Figure 6:
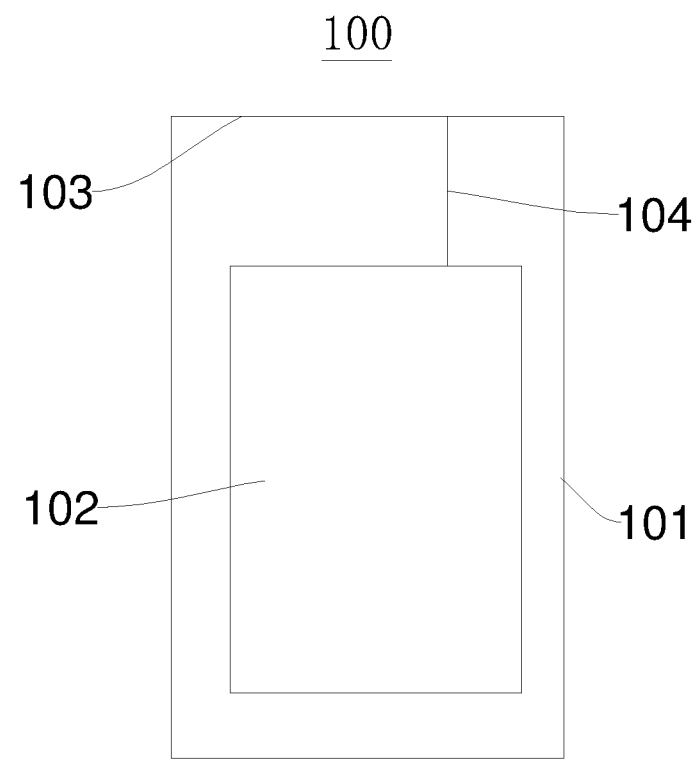
FIG. 6 is a schematic cross-sectional view of a cell according to an implementation of the present disclosure.
Figure 7:
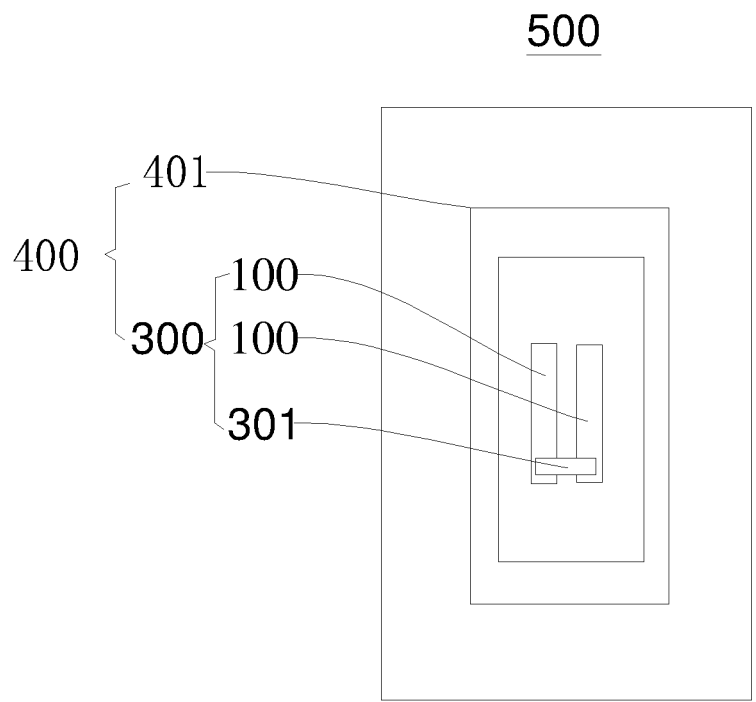
FIG. 7 is a schematic view of an electric vehicle according to an implementation of the present disclosure.

As shown in FIG. 1 and FIG. 5, the present disclosure provides a battery cover plate assembly 103, including a cover plate 1, a first pole 2, a second pole 103a, a flipping member 5, a scored member 6 and a first conductive member 7. The first pole 2 is electrically connected to the cover plate 1. The second pole 103a includes an upper pole 3 and a lower pole 4 spaced apart from each other. The upper pole 3 and the lower pole 4 are both fixed in an electrically insulated manner to the cover plate 1. The second pole 4 is electrically connected to a cell core 102. The first conductive member 7 is electrically connected to the upper pole 3. The scored member 6 is divided by a score 62 thereon into a first scored member 61 and a second scored member 63. The first scored member 61 is electrically connected to the first conductive member 7. The second scored member 63 is electrically connected to the lower pole 4. The cover plate 1 includes a cover plate body 11. The flipping member 5 is disposed on the cover plate body 11 and is in communication with gas inside a battery. The battery cover plate assembly 103 further includes a telescopic assembly 103b. The telescopic assembly 103b includes an insulation column 8 and a sleeve 200 slidably sleeved thereon. One end of the insulation column 8 is connected to one of the flipping member 5 and the first conductive member 7. One end of the sleeve 200 is connected to the other one of the flipping member 5 and the first conductive member 7. The flipping member 5 is configured to turn over under the action of gas pressure inside the battery and push, by means of the telescopic assembly 103b, the first conductive member 7 to move to break the score 62, so as to electrically disconnect the upper pole 3 from the lower pole 4.

One of the first pole 2 and the second pole 103a is a positive pole, and the other is a negative pole. Optionally, the first pole 2 is a positive pole, and the second pole 103a is a negative pole. The cover plate 1 is directly electrically connected to the first pole 2. In a normal case, a current is inputted to and outputted from the first pole 2 and the second pole 103a respectively, thus completing the charging and discharging of a cell 100. In an abnormal state, for example, when the battery is overcharged, the flipping member 5 or other related parts respond quickly and disrupt the electrical connection between the upper pole 3 and the lower pole 4 that constitute the second pole 103a, so as to interrupt the current input and current output of the battery, providing a circuit-breaking protection effect.

By means of the above technical solution, when the battery is overcharged or under other abnormal conditions, the temperature of the battery rises and the gas pressure therein increases, the flipping member 5 can turn over under the action of the gas pressure inside the battery to break the score 62, so as to electrically disconnect the cell core 102 from the external circuit to prevent the battery from thermal runaway which causes explosion or burning. In addition, because the sleeve 200 and the insulation column 8 are nested with each other, they can move relative to each other, so that when the gas pressure inside the battery is low, the scored member 6 is not stressed, thereby preventing the scored member 6 from fatigue failure.

The principle of protection with the scored member 6 in the present disclosure is described in detail below with reference to FIG. 3.

Figure 3:
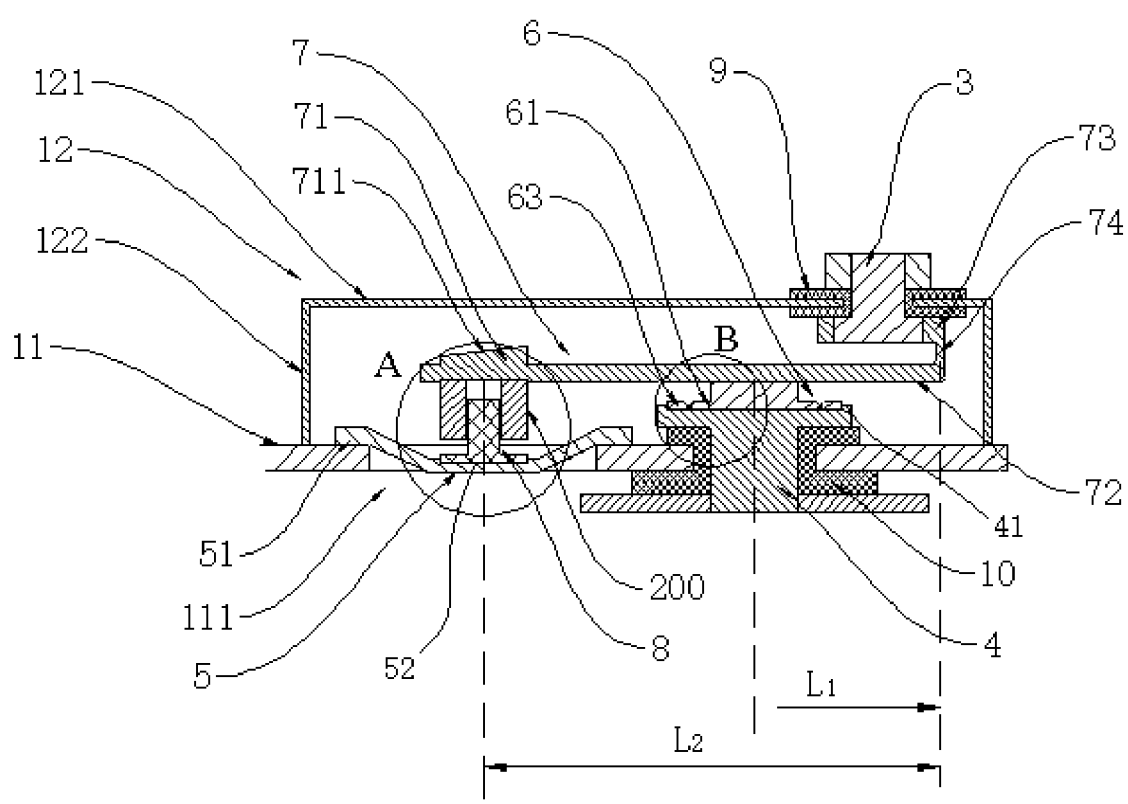
FIG. 3 is a schematic cross-sectional view of a battery cover plate assembly according to an implementation of the present disclosure, in which a first pole is not shown.

In an implementation shown in FIG. 3, one end of the insulation column 8 is connected to the flipping member 5, and one end of the sleeve 200 is connected to the first conductive member 7. When the gas pressure inside the battery is low, the insulation column 8 moves upward along with the flipping member 5, and the sleeve 200 remains still. During this movement, both the first conductive member 7 and the scored member 6 are in an unstressed natural state. Only when the gas pressure inside the battery rises to a preset value and the telescopic assembly 103b is pressed to the maximum extent, the first conductive member 7 starts to become stressed. As the gas pressure continues to rise, the insulation column 8, while moving upward along with the flipping member 5, also pushes the sleeve 200 to move upward, so that the first conductive member 7 deforms to break the score 62 on the scored member 6.

That is to say, in the present disclosure, the configuration of the telescopic assembly 103b allows the flipping member 5 to have a certain distance of idle stroke. When the gas pressure inside the battery is low, the moving distance of the flipping member 5 is limited within the idle stroke, during which process the scored member 6 is not stressed. Only after the gas pressure rises to the preset value, the scored member 6 starts to become stressed. Therefore, the present disclosure can avoid the case that the scored member 6 is in a stressed state for a long term and consequently the actual breaking force of the scored member is lower than the designed value or even the scored member prematurely fails, thereby prolonging the service life of the scored member 6, and ensuring the safety of the battery.

In the present disclosure, the sleeve 200 is connected to the first conductive member 7 and the insulation column 8 is connected to the flipping member 5, or the sleeve 200 is connected to the flipping member 5 and the insulation column 8 is connected to the first conductive member 7. In an implementation, as shown in FIG. 3, one end (lower end) of the insulation column 8 is connected to the flipping member 5, and one end (upper end) of the sleeve 200 is connected to the first conductive member 7. An upper end of the insulation column 8 is formed as a free end capable of sliding vertically along an axis of the sleeve 200.

The insulation column 8 may be formed into any suitable structure and shape. In an implementation as shown in FIG. 3 and FIG. 4, the insulation column 8 is in the shape of a stepped shaft and includes a large-diameter portion 81 and a small-diameter portion 83, a step surface 82 is formed between the large-diameter portion 81 and the small-diameter portion 83, the small-diameter portion 83 is slidably fitted in the sleeve 200, and the large-diameter portion 81 is connected to the flipping member 5 or the first conductive member 7.

Figure 4:
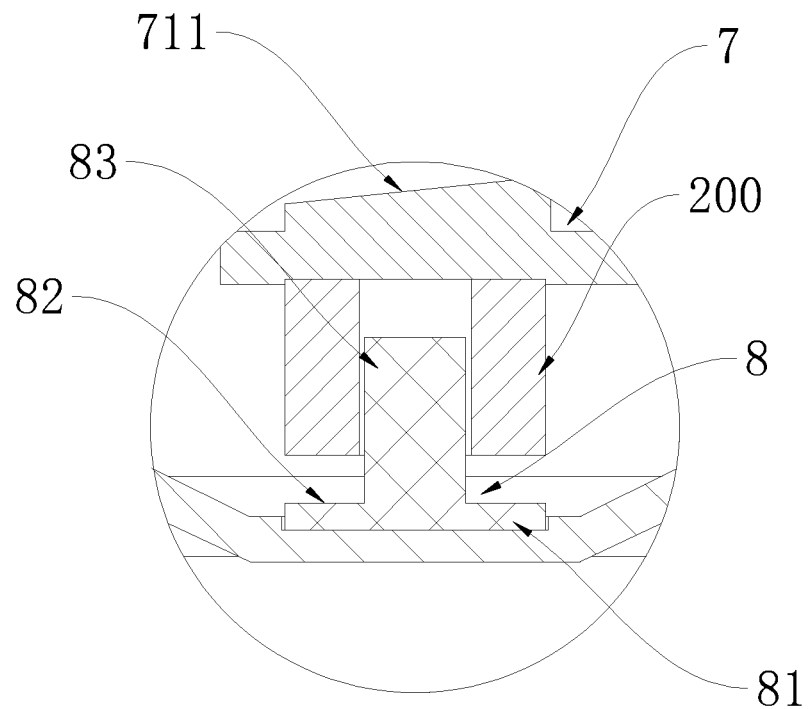
FIG. 4 is a schematic enlarged view of part A in FIG. 3.

In this way, when the step surface 82 is in contact with an end face of the sleeve 200 (a lower end face of the sleeve 200 as shown in FIG. 4), the telescopic assembly 103b is at its minimum length, and the first conductive member 7 starts to become stressed. In this case, the insulation column 8 moves upward again, and pushes the sleeve 200 to move upward to break the score 62. In a case that the sleeve 200 is made of a metal material, the configuration of the step surface 82 on the insulation column 8 can prevent the sleeve 200 from coming into contact with the flipping member 5 to electrically connect the first conductive member 7 and the flipping member 5. In addition, by connecting the large-diameter portion 81 to the flipping member 5, the insulation column 8 can be stably mounted on the flipping member 5.

Further, as shown in FIG. 4, the flipping member 5 is provided with a groove structure 52, and a lower end portion of the insulation column 8 is fitted in the groove structure 52 to improve the reliability of the connection between the insulation column 8 and the flipping member 5. In other implementations, the insulation column 8 and the flipping member 5 may be integrally formed, and the sleeve 200 may also be integrally formed on the first conductive member 7.

Figure 2:
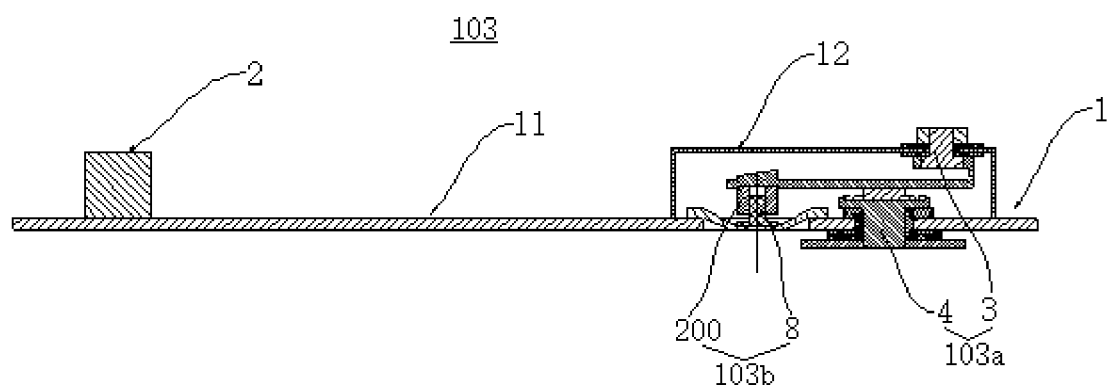
FIG. 2 is a schematic cross-sectional view of a battery cover plate assembly according to an implementation of the present disclosure.

In the present disclosure, as shown in FIG. 2 and FIG. 3, the cover plate 1 further includes a second conductive member 12, the upper pole 3 is fixed in an electrically insulated manner to the second conductive member 12, the second conductive member 12 is electrically connected to the cover plate body 11, the lower pole 4 is fixed in an electrically insulated manner to the cover plate body 11, and the first conductive member 7 is configured to move under driving of the flipping member 5, so as to come into contact with the second conductive member 12 to form an electrical connection.

When an abnormality occurs inside the battery, the flipping member 5 pushes the first conductive member 7 by means of the insulation column 8 or the sleeve 200. When the flipping member 5 breaks the score 62 under the action of the gas pressure inside the battery, the electrical connection between the upper pole 3 and the lower pole 4 is disrupted. When the flipping member 5 is further turned over, it drives the first conductive member 7 to move so that the first conductive member 7 comes into contact with the second conductive member 12, thereby connecting the upper pole 3 and the cover plate 1. In this way, the upper pole 3 can be directly connected to the first pole 2 by the cover plate 1, so that the positive and negative electrodes of the cell 100 are short-circuited and function as a segment of lead in the entire circuit, thereby avoiding the sudden breaking of the circuit of the entire power battery and improving the safety of the vehicle.

To ensure the reliability of the operation of the battery and protect against accidental impact or corrosion by the ambient environment which may cause damage to or failure of the scored member 6 and the flipping member 5, in an implementation, as shown in FIG. 3, the second conductive member 12 may be formed as a protection cover covering the lower pole 4, the flipping member 5, the scored member 6, the first conductive member 7 and the telescopic assembly 103b, to provide a reliable protection function for the above parts, especially for the scored member 6.

The second conductive member 12 may have any suitable structure and shape. In an implementation, as shown in FIG. 3, the second conductive member 12 may include a top plate 121 and a sidewall plate 122 extending downward from an edge of the top plate 121, the upper pole 3 is embedded in an electrically insulated manner on the top plate 121, and a lower end of the sidewall plate 122 is electrically connected to the cover plate body 11. Optionally, the second conductive member 12 may be formed into a cylindrical shape, to facilitate the fabrication and improve the structural aesthetics of the cell 100.

In this implementation, the first conductive member 7 can move upward driven by the flipping member 5, so as to come into contact with the top plate 121, thus short-circuiting the upper pole 3 and the first pole 2.

In the present disclosure, as shown in FIG. 3, the first conductive member 7 is formed thereon with a first protrusion 71 configured to contact with the second conductive member 12. Further, a top surface 711 of the first protrusion 71 may be formed as an inclined surface, so that the first protrusion 71, after being lifted up, can form a surface contact with the second conductive member 12. Specifically, as shown in FIG. 3, when the first conductive member 7 moves toward the second conductive member 12, the top surface 711 may form a surface contact with the bottom of the top plate 121. In this way, not only the reliability of the electrical connection between the first conductive member 7 and the second conductive member 12 can be improved, but also the surface contact can reduce the resistance compared with line contact or point contact.

Based on a comprehensive consideration of factors such as the dimensions and positions of the parts of the battery cover plate assembly 103, preferably, the top surface 711 may be tilted at an angle in the range of 5°-20°.

Further, as shown in FIG. 3, the first protrusion 71 and the insulation column 8 may be coaxially disposed, to further ensure that the first conductive member 7 can come into contact with the second conductive member 12 in a timely manner.

In the present disclosure, the first conductive member 7 may have any suitable structure and shape. In an implementation, as shown in FIG. 3, the first conductive member 7 includes a main body portion 72 and a mounting portion 73. The mounting portion 73 is electrically connected to the upper pole 3. To facilitate the contact of the first conductive member 7 with the second conductive member 12, the main body portion 72 may be formed into an elongated structure. One end of the main body portion 72 is connected to the sleeve 200 or the insulation column 8, the other end of the main body portion 72 is flexibly connected to the mounting portion 73, and a middle portion of the main body portion 72 is electrically connected to the first scored member 61.

Because one end of the main body portion 72 is flexibly connected to the mounting portion 73, the main body portion 72 rotates about its connection point with the mounting portion 73 when the flipping member 5 is turned over under the action of the gas pressure inside the battery (that is, the main body portion 72 is leveraged). Because the middle portion of the main body portion 72 is electrically connected to the first scored member 61, i.e., the connection point between the main body portion 72 and the first scored member 61 is located between the connection point between the main body portion 72 and the sleeve 200 or the insulation column 8 and the connection point between the main body portion 72 and the mounting portion 73 (i.e., the lever fulcrum), a distance L1 between the connection point between the main body portion 72 and the first scored member 61 and the connection point between the main body portion 72 and the mounting portion 73 is less than a distance L2 between the connection point between the main body portion 72 and the sleeve 200 or the insulation column 8 and the connection point between the main body portion 72 and the mounting portion 73, that is, L1<L2, so that the turning member 5 has a long arm of force when driving the first conductive member 7 to move. Based on the principle of leverage, the force required to break the score 62 can be greatly reduced. Therefore, on the one hand, the size of the flipping member 5 can be reduced to adapt to smaller batteries and improve the universality of the battery cover plate assembly 103, on the other hand, the sensitivity of the battery cover assembly 103 in interrupting the current can be improved.

The flexible connection between the main body portion 72 and the mounting portion 73 not only requires a smaller force to drive the main body portion 72 to rotate upward and improves the sensitivity and reliability of circuit-breaking protection and short-circuiting protection, but also reduces the force applied by the first conductive member 7 on the upper pole 3, so as not to affect the structural stability at the connection between the upper pole 3 and the second conductive member 12.

In the present disclosure, the main body portion 72 may be flexibly connected to the mounting portion 73 in any suitable manner. As an implementation, as shown in FIG. 3, the first conductive member 7 may be an integral electrically conductive sheet, the first conductive member 7 further includes an intermediate portion 74 formed between the main body portion 72 and the mounting portion 73, and a thickness of the intermediate portion 74 is less than thicknesses of the main body portion 72 and the mounting portion 73. In this way, by weakening the strength of the intermediate portion 74, the force required for driving the main body portion 72 to rotate upward is further reduced. In addition, by means of the configuration of the intermediate portion 74, the main body portion 72 is spaced apart from the upper pole 3 by a certain distance, so that the main body portion 72 can avoid the upper pole 3 while rotating upward to come into contact with the second conductive member 12, thereby further ensuring the structural stability of the battery cover plate assembly 103.

To facilitates the fabrication, in an implementation, as shown in FIG. 3, the main body portion 72 is parallel to the mounting portion 73, the intermediate portion 74 is perpendicular to the main body portion 72 and the mounting portion 73, the main body portion 72 and the mounting portion 73 are located on the same side of the intermediate portion 74, and a length of the main body portion 72 is greater than a length of the mounting portion 73.

In other alternative implementations, one end of the main body portion 72 may be hinged to the mounting portion 73, so as to greatly reduce the force required for driving the main body portion 72 to rotate upward.

In the present disclosure, as shown in FIG. 3, the cover plate body 11 is provided with a through hole 111 in communication with the gas inside the battery, and the flipping member 5 covers the through hole 111. As shown in FIG. 2 and FIG. 3, in an implementation, the flipping member 5 may include a bottom plate, a side wall obliquely extending upward from an edge of the bottom plate, and a flange 51 horizontally extending outward from an upper end of the side wall, and the flange 51 is configured to be overlapped on the cover plate body 11. The flange 51 may be connected to the cover plate body 11 by welding, to prevent the flipping member 5 from detaching from the cover plate body 11 during turnover, thereby ensuring the reliability of circuit-breaking protection for the battery.

In this implementation, the flipping member 5 covers the through hole 111 in a sealing manner, which, on the one hand, can prevent the gas inside the battery from overflowing from the through hole 111 and ensure the effect of the gas on the flipping member 5. On the other hand, as the scored member 6 is isolated from the inside of the battery by the flipping member 5, not only the scored member 6 can be prevented from coming into contact with the electrolytic solution inside the battery, to eliminate the risk of failure of the scored member 6 resulting from the corrosion by the electrolytic solution, but also the risk of creepage between the parts resulting from the pollution by the electrolytic solution can be reduced, thereby improving the reliability of related parts during use.

In addition, as shown in FIG. 3 and FIG. 5, the first scored member 61 may be formed thereon with a second protrusion 611. The second protrusion 611 is connected to the first conductive member 7, so that a spacing exists between the first conductive member 7 and the second scored member 63, thereby ensuring reliability of circuit-breaking protection. That is, it is ensured that the second scored member 63 and the first conductive member 7 are always in a non-contact state in the entire circuit-breaking protection and short-circuiting process of the battery, thereby preventing the upper pole 3 and the lower pole 4 from being electrically connected each other during this process.

In the present disclosure, the lower pole 4 and the scored member 6 may adopt any suitable connection structure. In an implementation, as shown in FIG. 3 and FIG. 5, the scored member 6 is supported by an upper end of the lower pole 4, and the upper pole 3 and the lower pole 4 are not coaxial. Specifically, an annular recess 41 supporting the scored member 6 is formed at the upper end of the lower pole 4, and the score 6 is formed into a round shape. An outer periphery of the scored member 6 may be fitted and fixed on an inner periphery of the annular recess 41 by welding or other means. In other possible implementations, the upper pole 3 and the lower pole 4 may be coaxial.

In the present disclosure, to make it easy to break the score 62, the score 62 may be disposed surrounding the second protrusion 611. Further, the score 62 may be formed into an elliptical shape. In this way, under the action of the gas pressure, because the contour has difference curvatures, a region with a larger curvature of the score 62 is more stressed due to concentrated stress, and is the first to be broken, thereby the sensitivity in breaking the score 62 can be improved.

In the present disclosure, as shown in FIG. 3, the battery cover plate assembly 103 further includes a first insulating ring 9 and a second insulating ring 10, the upper pole 3 may be fixedly supported by the second conductive member 12 by means of the first insulating ring 9, and the lower pole 4 may be fixedly supported by the cover plate body 11 by means of the second insulating ring 10.

The operating principle and process of implementing circuit-breaking protection and short-circuiting protection with the battery cover plate assembly 103 according to an implementation of the present disclosure will be briefly described below with reference to the accompanying drawings.

First, the gas pressure inside the battery pushes the flipping member 5 to turn over, the flipping member 5 drives the insulation column 8 to slide upward in the sleeve 200, and when the step surface 82 of the insulation column 8 is in contact with the lower end face of the sleeve 200, the first conductive member 7 starts to become stressed and move upward to break the score 62, so as to electrically disconnect the upper pole 3 from the cell core 102.

Then, the flipping member 5 is further turned over, and drives the first conductive member 7 to move upward, so that the upper end face 711 of the first protrusion 71 comes into contact with and is thus connected to the second conductive member 12, thereby short-circuiting the upper pole 3 and the first pole 2.

According to another aspect of the present disclosure, a cell 100 is provided. As shown in FIG. 1, the cell 100 includes a cell casing 101 and a cell core 102 accommodated in the cell casing 101, and further includes the battery cover plate assembly 103 described above. The cover plate 1 is configured to package the cell casing 101. The lower pole 4 and the cell core 102 are electrically connected to each other by an inner lead-out member 104.

According to another aspect of the present disclosure, a battery module 300 is provided. The battery module 300 includes a plurality of cells 100 and a plurality of connectors 301. One end of the connector 301 is electrically connected to the first pole 2 of one of the cells 100, and the other end of the connector 301 is electrically connected to the upper pole 3 of the second pole 103*a* of another cell 100.

According to another aspect of the present disclosure, a power battery 400 is provided, including a battery pack housing 401 and a battery module 300 disposed inside the battery pack housing 401. The battery module 300 is the battery module 300 described above.

According to another aspect of the present disclosure, an electric vehicle 500 is provided. The electric vehicle 500 includes the power battery 400 described above.

The preferred embodiments of the present disclosure have been described in detail with reference to the accompanying drawings, but the present invention is not limited to specific details in the implementations. Various simple variations may be made to the technical solutions of the present disclosure within the scope of the technical idea of the present disclosure. Such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

What is claimed is:

1. A battery cover plate assembly, comprising a cover plate, a first pole, a second pole, a flipping member, a scored member and a first conductive member, wherein the first pole is electrically connected to the cover plate, the second pole comprises an upper pole and a lower pole spaced apart from each other, the upper pole and the lower pole are both fixed in an electrically insulated manner to the cover plate, the second pole is electrically connected to a cell core, the first conductive member is electrically connected to the upper pole, the scored member is divided by a score thereon into a first scored member and a second scored member, the first scored member is electrically connected to the first conductive member, the second scored member is electrically connected to the lower pole, the cover plate comprises a cover plate body, the flipping member is disposed on the cover plate body and is in communication with gas inside a battery, and the battery cover plate assembly further comprises a telescopic assembly, the telescopic assembly comprises an insulation column and a sleeve slidably sleeved thereon, one end of the insulation column is connected to one of the flipping member and the first conductive member, one end of the sleeve is connected to the other one of the flipping member and the first conductive member, and the flipping member is configured to turn over under the action of gas pressure inside the battery and push the first conductive member to move to break the score by means of the telescopic assembly, so as to electrically disconnect the upper pole from the lower pole.

2. The battery cover plate assembly according to claim 1, wherein one end of the insulation column is connected to the flipping member, and one end of the sleeve is connected to the first conductive member.

3. The battery cover plate assembly according to claim 1, wherein the insulation column is in the shape of a stepped shaft and comprises a large-diameter portion and a small-diameter portion, a step surface is formed between the large-diameter portion and the small-diameter portion, the small-diameter portion is slidably fitted in the sleeve, the large-diameter portion is connected to the flipping member or the first conductive member, and when the step surface is in contact with an end face of the sleeve, the first conductive member starts to move.

4. The battery cover plate assembly according to claim 2, wherein the flipping member is provided with a groove structure, and a lower end portion of the insulation column is fitted in the groove structure.

5. The battery cover plate assembly according to claim 1, wherein the cover plate further comprises a second conductive member, the upper pole is fixed in an electrically insulated manner to the second conductive member, the second conductive member is electrically connected to the cover plate body, the lower pole is fixed in an electrically insulated manner to the cover plate body, and the first conductive member is configured to move under driving of being driven by the flipping member, so as to come into contact with the second conductive member to form an electrical connection.

6. The battery cover plate assembly according to claim 5, wherein the second conductive member is formed as a protection cover covering the lower pole, the flipping member, the scored member, the first conductive member and the telescopic assembly.

7. The battery cover plate assembly according to claim 6, wherein the second conductive member comprises a top plate and a sidewall plate extending downward from an edge of the top plate, the upper pole is embedded in an electrically insulated manner on the top plate, and a lower end of the sidewall plate is electrically connected to the cover plate body, and wherein the first conductive member is configured to move when driven by the flipping member, so as to come into contact with the top plate.

8. The battery cover plate assembly according to claim 5, wherein the first conductive member is formed with a first protrusion configured to contact with the second conductive member, and wherein a top surface of the first protrusion is formed as an inclined surface, so that the first protrusion forms a surface contact with the second conductive member.

9. The battery cover plate assembly according to claim 8, wherein the top surface is tilted at an angle in the range of 5°-20°.

10. The battery cover plate assembly according to claim 8, wherein the first protrusion and the insulation column are coaxially disposed.

11. The battery cover plate assembly according to claim 1, wherein the first conductive member comprises a main body portion and a mounting portion, the mounting portion is electrically connected to the upper pole, the main body portion is formed as an elongated structure, one end of the main body portion is connected to the sleeve or the insulation column, the other end of the main body portion is flexibly connected to the mounting portion, and a middle portion of the main body portion is electrically connected to the first scored member.

12. The battery cover plate assembly according to claim 11, wherein the first conductive member is an integral electrically conductive sheet, the first conductive member further comprises an intermediate portion formed between the main body portion and the mounting portion, and a thickness of the intermediate portion is less than thicknesses of the main body portion and the mounting portion.

13. The battery cover plate assembly according to claim 12, wherein the main body portion is parallel to the mounting portion, the intermediate portion is perpendicular to the main body portion and the mounting portion, the main body portion and the mounting portion are located on the same side of the intermediate portion, and a length of the main body portion is greater than a length of the mounting portion.

14. The battery cover plate assembly according to claim 1, wherein the cover plate body is provided with a through hole in communication with the gas inside the battery, and the flipping member covers the through hole.

15. The battery cover plate assembly according to claim 1, wherein the first scored member is provided with a second protrusion, and the second protrusion is electrically connected to the first conductive member, and wherein the score is disposed surrounding the second protrusion.

16. The battery cover plate assembly according to claim 15, wherein the score is formed into an elliptical shape.

17. The battery cover plate assembly according to claim 1, wherein the scored member is supported by an upper end of the lower pole, and the upper pole and the lower pole are not coaxial, and wherein an annular recess supporting the scored member is formed at the upper end of the lower pole, and an outer periphery of the scored member is fitted and fixed on an inner periphery of the annular recess.

18. A cell, comprising a cell casing and a cell core accommodated in the cell casing, wherein the cell further comprising the battery cover plate assembly according to claim 1, wherein the cover plate is configured to package the cell casing, and the lower pole and the cell core are electrically connected to each other by an inner lead-out member.

19. A power battery, comprising a battery pack housing and a battery module disposed inside the battery pack housing, wherein the battery module comprises: a plurality of cells and a plurality of connectors, one end of a connector is electrically connected to a first pole of a cell, and the other end of the connector is electrically connected to an upper pole of a second pole of another cell; wherein each of the plurality of cells comprises a cell casing and a cell core accommodated in the cell casing, wherein each of the plurality of cells further comprises the battery cover plate assembly according to claim 1, wherein the cover plate is configured to package the cell casing, and a lower pole and the cell core are electrically connected to each other by an inner lead-out member.

* * * * *

UNITED STATES PATENT AND TRADEMARK OFFICE
CERTIFICATE OF CORRECTION

| | |
|---|---|
| PATENT NO. | : 11,437,689 B2 |
| APPLICATION NO. | : 17/050295 |
| DATED | : September 6, 2022 |
| INVENTOR(S) | : Wengang Wu et al. |

It is certified that error appears in the above-identified patent and that said Letters Patent is hereby corrected as shown below:

In the Claims

In Claim 5, Column 12, Line 67, "conductive member is configured to move under driving of being driven by the flipping member" should read -- conductive member is configured to move being driven by the flipping member --

Signed and Sealed this
Fifth Day of September, 2023

Katherine Kelly Vidal
*Director of the United States Patent and Trademark Office*